June 19, 1923.  W. K. THÖRIG  1,459,120
MOLD FOR MANUFACTURING MONEY CHESTS AND THE LIKE
Filed July 22, 1921    3 Sheets-Sheet 3
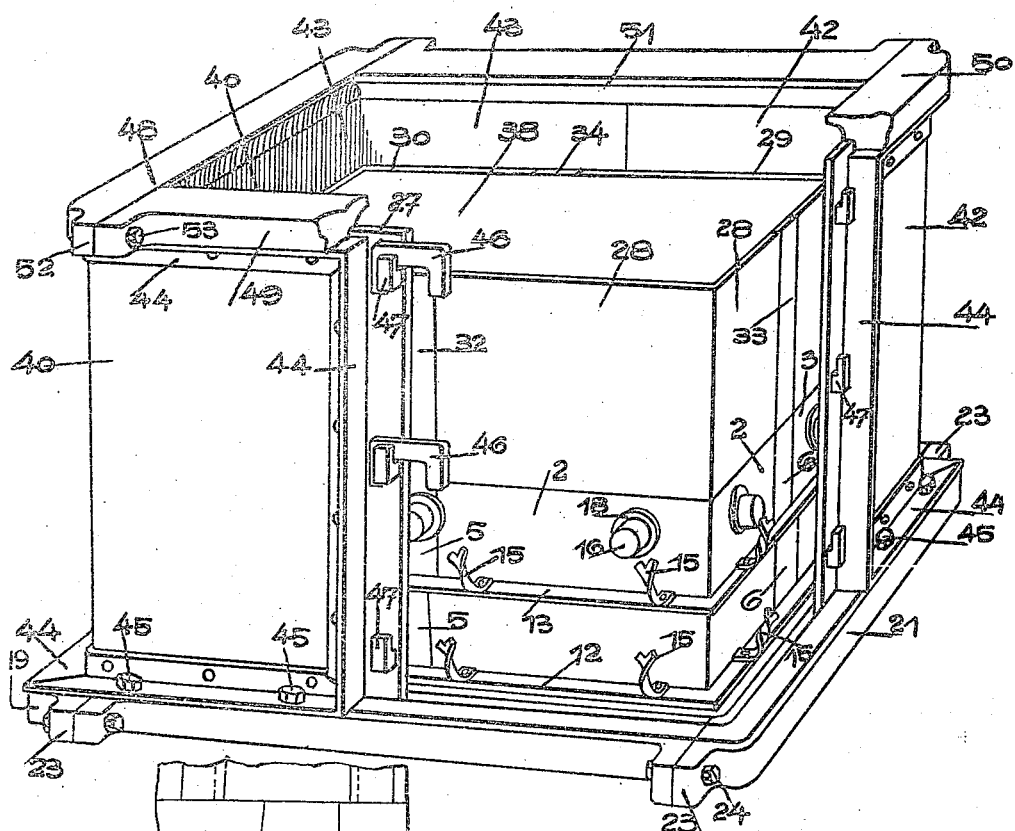
FIG.5.
FIG.7.
Inventor
Werner Konrad Thörig
By Lawrence Langner
Attorney Patented June 19, 1923.

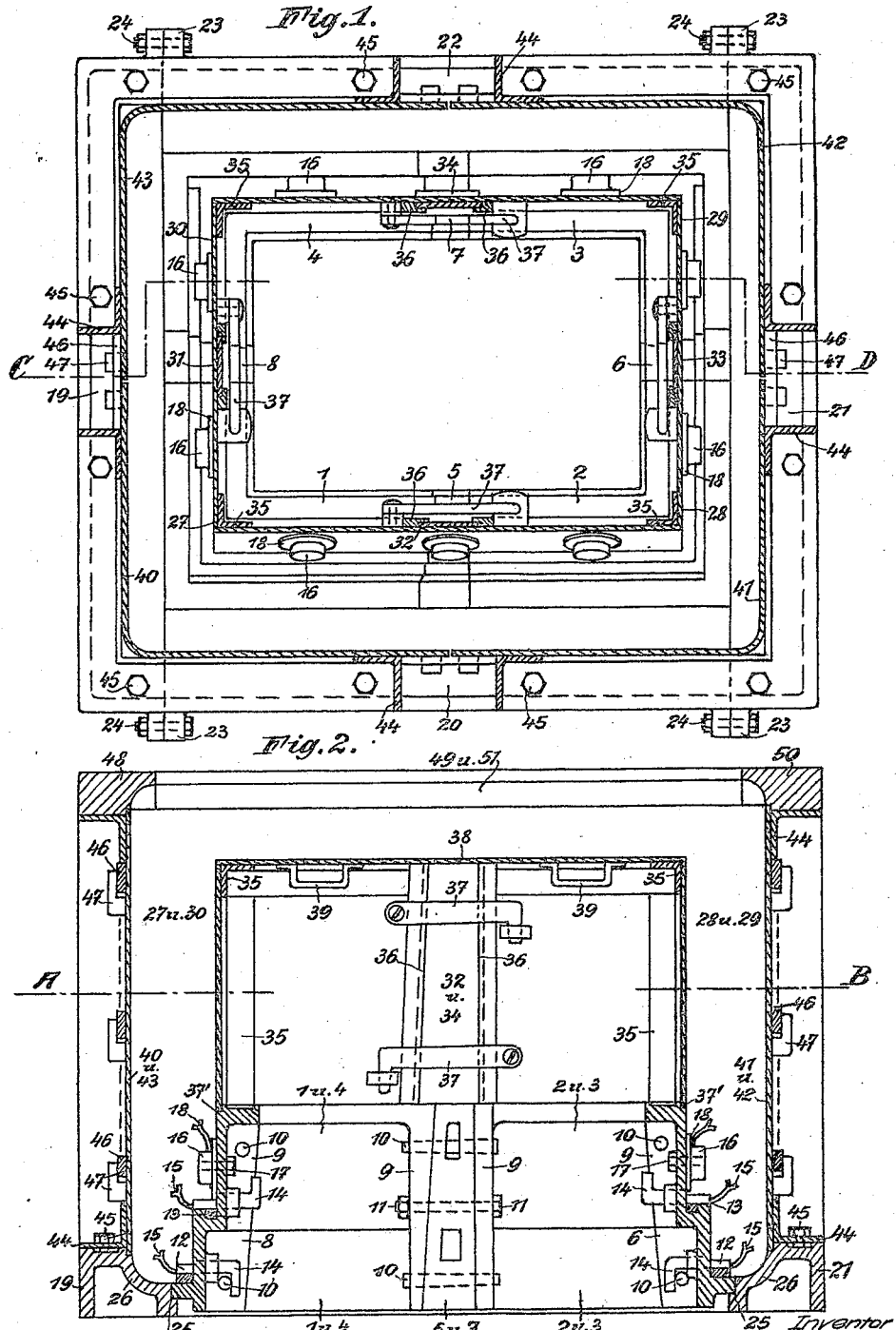

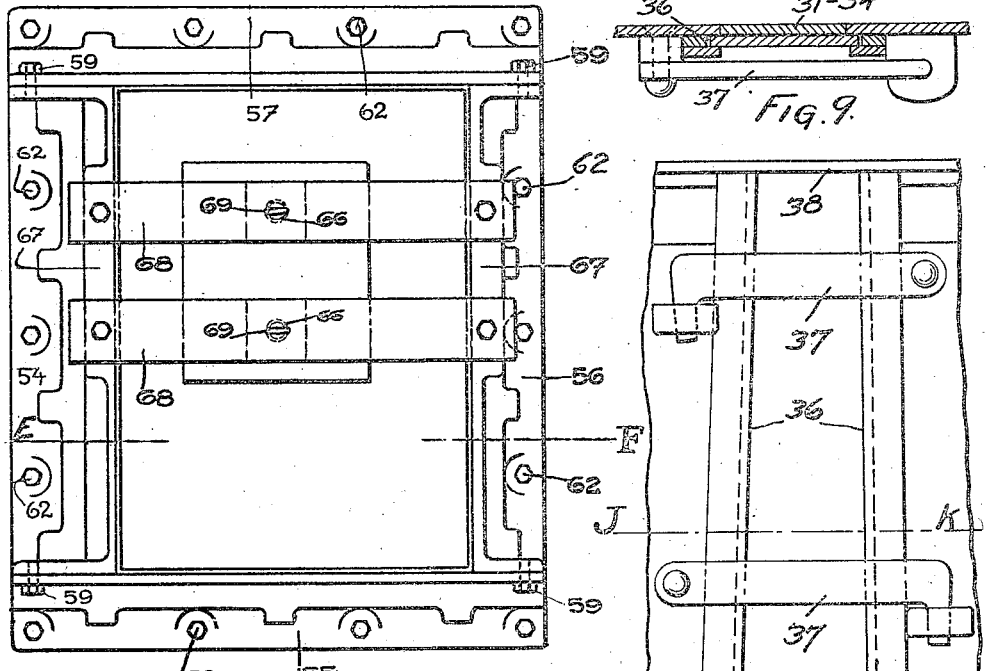
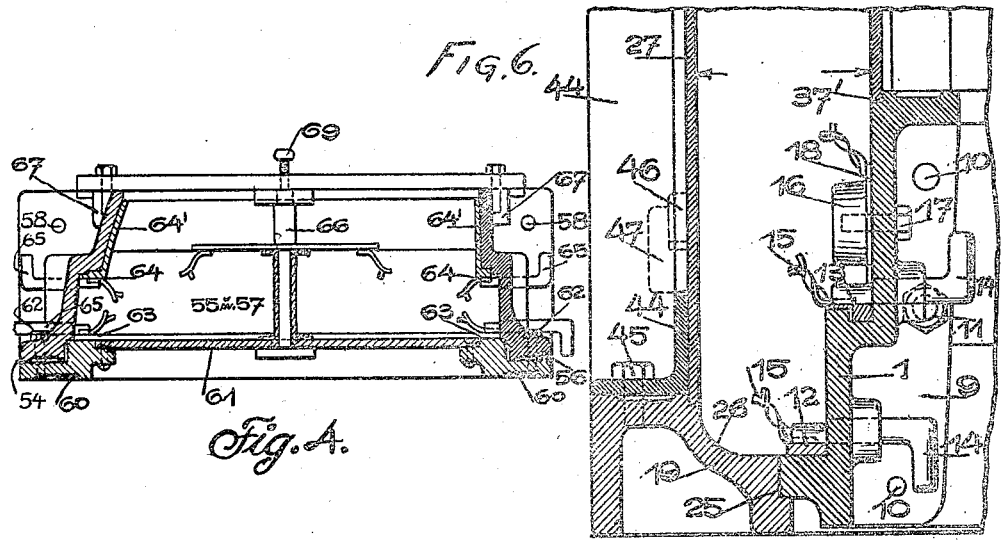

1,459,120

UNITED STATES PATENT OFFICE.

WERNER KONRAD THÖRIG, OF ZURICH, SWITZERLAND.

MOLD FOR MANUFACTURING MONEY CHESTS AND THE LIKE.

Application filed July 22, 1921. Serial No. 486,898.

*To all whom it may concern:*

Be it known that I, WERNER KONRAD THÖRIG, a citizen of the Republic of Switzerland, and resident of Zurich, Switzerland, have invented a certain new and useful Improved Mold for Manufacturing Money Chests and the like, of which the following is a specification.

This invention relates to a molding device for manufacturing strong-boxes, money-chests, and the like, from concrete and iron. Such chests and boxes have already been manufactured in accordance with the principles employed in ferro-concrete construction, the product being a monolithic structure reinforced or armored by iron. They are made without outer and inner iron walls, so that the concrete which is reinforced or armored in accordance with static principles is the only bearing constructive element. My invention forms an improvement upon such monolithic boxes or chests, but to make the features establishing the improvement perfectly clear, I think it necessary to describe as briefly as possible the manner of manufacturing as hitherto practised.

For the chest-body, as well as for the door, a separate wooden sheeting-work, framework, or falsework, was provided, upon which the outer and inner iron parts, such as frames and joins, furnished with stone-anchors, the lock-plate, and some other necessary parts, all to be enclosed in the concrete of the chest-body and the door, were affixed by screws. The reinforcing-parts were plaited around the inner falsework-core, the outer sheeting was erected, and the space between these two latter filled up with concrete. After sufficient hardening the outer sheeting of the chest-body was removed, the screws pertaining to the iron parts were unscrewed, and the inner core (provided with wedges for the purpose of facilitating dismantling the falsework) was drawn out of the chest after the wedges had been removed. Dismantling the falsework of the door was effected in like manner. After the screws holding fast the iron frames were unscrewed, the falsework (consisting of four side-parts and one bottom-plate) was taken to pieces and the door hinged to the body by means of the hinge-parts affixed to the respective iron parts.

This manner of hinging the door is connected with certain drawbacks resulting from the sheeting of the wooden falsework bending through warping, contorting, the wooden wedges swelling, and the like, whereby removing the wedges from the false-work is rendered difficult and the originally fixed dimensions altered, so that accurate fitting of the door into the join cannot be attained. Owing to these reasons I now abstain from employing wood for constructing the false-work or molds and in lieu thereof I employ a rigid material, such as cast-iron and sheet-iron, which allows of producing molds that are and remain perfectly accurate, especially as regards their dimensions, because they are completely rigid owing to the material in question.

I am aware of the fact that iron molds have already been made use of for manufacturing concrete bodies, such as tubes and pipes, poles, shafts, sink-water traps, and the like, but in all these cases the articles are such where no particular accuracy is required. The molds known in connection with such concrete articles consist in most cases of sheet-iron. Concerning, however, the present invention, the circumstances are materially different.

In manufacturing strong boxes, money-chests, and the like, very great attention must be paid to the doors fitting especially accurate into the joins of the bodies so as to prevent fire-gases from getting access into the interior of the chest, etc., in the case of a fire, as already mentioned. To attain such tightness also with concrete money-chests and the like of the before-mentioned kind, I insert flat iron bars into the concrete of the body, as well as of the door, at the outer join, said bars fitting tightly together on the door being hinged and closed. The joints between the concrete of the body and of the door must be limited to a minimum and also the inner iron join-frames (fire-folds) of said two parts must fit quite exactly the one into the other.

Whilst, now, if wooden falsework is, or wooden molds are, employed, the iron frames and joins attached to the wood are affected as regards the shape and dimensions, viz, by reason of the wooden parts warping, whereby the door is prevented from accurately fitting, I propose, in and by my present invention, to make use of rigid iron structures for all those parts which have to do with securing the position of the iron frames and joins provided for the doors. I prefer to employ machined grey cast-iron which is especially suited for the purpose in question owing to its rigidity and the possibility of working it very exactly whereby excellent fitting of the doors is warranted.

This grey cast-iron forms at the body a closed frame which is planed to fractions of a millimeter and represents a negative of the door-abutment; or it forms the casting-core of the door-opening respectively; and the frames of the flat iron, as well as of the join-iron, are clamped in place by means of appropriate devices.

An alteration or a displacement during applying the concrete is out of the question, because the cast parts remain perfectly unchanged, and neither bending through, nor other deviations from the original dimensions take place. The shape and dimensions of the door-opening of the body are, thus, positively determined by the casting-core in question, and the frames of flat iron, as well as the join-frames, are and remain, as soon as the casting-core has been removed, in their proper relative position, without any alteration whatever. The outer and inner sheetings for the chest-walls are then erected upon said frame-casting which is provided with four detachable wedges facilitating removing the casting from the door-opening. Similar detachable wedges are applied to the inner sheeting. The sheetings consist of sheet-iron and are provided with a structure of angle-iron forming a reinforcing means for sheet-iron sheetings and preventing these latter from bending through during applying the concrete.

The mold for the door which consists of four frame-parts connected with each other by screws, and of a sheet-iron plate fitted in between said frame-parts and being supported in a special casting-frame, is made entirely of grey cast-iron and forms a negative of the door-abutment, the necessary play being duly considered. The casting is planed exactly corresponding to the dimensions of the door and the outer and inner frames of flat iron, as well as the join-frames are secured in proper position upon them by suitable clamping-means, so that, just as with the body, also the door-frames are not displaced or otherwise affected during applying the concrete. Only if the door-opening of the chest and the door itself are in perfect correspondence, as made possible by the improved method in question, the door fits exactly into that opening, and expensive supplementary work may be dispensed with.

Besides the frames mentioned, also all other iron-parts pertaining to the strong box or money-chest, such as the lock-plate, the bolt-work, etc., may be pre-worked exactly to measure with aid of templets and gauges, so that a plurality of boxes and chests of the kind in question may be manufactured at a time whereby great economical advantages are obtained. Manufacturing the armoring is effected either by plaiting upon the core-mold or in known manner by assembling the reinforcing parts upon a special core, the cage-like structure thus produced being then placed in the mold proper.

In order to make my invention more clear, I refer to the accompanying drawings, in which similar numerals of reference denote similar parts throughout the several views, and in which Figure 1 is a horizontal section through the body-mold, the section being taken in line A—B of Figure 2. Figure 2 is a vertical section through this mold in line C—D of Figure 1. Figure 3 is a plan of the door-mold. Figure 4 is a vertical section in line E—F of Figure 3. Figure 5 is a perspective illustration showing the complete body-mold, a corner-piece of the outer sheet-iron sheeting being removed. Figure 6 is a vertical section, drawn on a larger scale, through the lower casting-part of the body-mold, the section being taken in line G—H of Figure 1. Figure 7 is an inner view of the wedges and their connection with the corner-pieces of the inner casting-core. Figure 8 is an inner view of other wedges and their connection with the corner-pieces of the inner sheet-iron sheeting. Figure 9 is a horizontal section in line J—K of Figure 8.

The mold for the chest body is so placed that the door opening is at the bottom. The rear wall of the chest-body is, thus, at the top where the mold is open. The concrete having been filled into the mold, the surface of the chest rear-wall is smoothened. The mold consists in its lower part of a planed frame of grey cast-iron (Figs. 1, 2, 5, 6) which consists, in its turn, of an inner core-frame and an outer frame joining the former. The core-frame is appropriately planed and forms the negative of the door-opening of the chest-body; furthermore, it serves for positioning the frames of flat iron and the join-frames to be embedded in the concrete.

When filling the mold with concrete that core-frame is situated in the interior of the chest, but owing to the pressure which the concrete exerts at all sides, as well as to its adhering to the core-surfaces, it is difficult to remove it afterwards in one piece. For this reason the core consists of four corner-pieces 1, 2, 3, 4 (Figs. 1, 2, 5), at each of the four joints of which a wedge 5, 6, 7, 8 (Figs. 1, 2, 5, 6, 7) is inserted. There are also wedges 9 which are fitted between the ribs 9 (Fig. 7) of the corner-pieces and the sectional area of which corresponds to that of these pieces; they are connected with the corner-pieces by set-pins 10 and nut-bolts 11

(Figs. 2, 6, 7) and make the whole structure a rigid frame after the concrete has hardened. When removing the core-frame, said wedges 9 are first disconnected and drawn outwards so that owing to the interstices thus produced between the corner-pieces also these latter may be removed without difficulty. The frames of flat iron and the join-iron frames 12 and 13 (Figs. 2, 5, 6) are keyed upon the core-frame by means of tensioning-devices 14 (Figs. 2, 6) and are thus secured in their position during filling the concrete into the mold, so that after the concrete has hardened and the core-frame has then been removed said frames are intimately connected with the chest body by their stone-anchors 15 (Figs. 2, 5, 6), without any change in their relative position, exactly in the position previously given them in the mold.

To form the lock-bolt holes in the concrete of the chest-wall, moulding bolts 16 (Figs. 1, 2, 5, 6) are secured to the core-frame by screws 17 (Figs. 2 and 6). Around these moulding-bolts a sheet-metal ring 18 with stone-anchors (Figs. 1, 2, 5, 6) is provided which after dismantling adheres in the concrete and forms a lining for the bolt-hole, whereas the bolt 16 may be removed from the bolt-hole in the concrete.

The casting-frame which joins the inner core-frame in outward direction consists of the four frame parts 19 20 21 22 (Figs. 1, 2, 5, 6), which have eyes 23 at the butt joints so that they may be firmly connected with each other by means of nut-bolts 24. The thus closed outer frame has around it a rabbet 25 encompassing exactly the above-mentioned core-frame whereas the groove 26 shapes the rounded edges and corners of the front side of the chest.

The hollow space for the reception of the armoring and the concrete of the chest-body walls is formed, as already mentioned, by an inner and an outer sheet-metal sheeting, each of which is accurately fitted into the rabbets or grooves of the inner and outer casting-frame (Figs. 2 and 6) and is supported by these latter.

The inner sheeting corresponds as a negative to the inner space of the chest-body; it molds the inner smooth surfaces of the body-walls and must, like the inner casting-core frame 1—8, allow of being easily removed from the interior of the chest. For this reason also this mold-part does not consist of one piece but owing to the pressure of the concrete and to this latter adhering to the sheeting-surfaces it is composed of several parts, viz, four corner-parts 27 28 29 30 (Figs. 1, 2, 5) and wedges 31 32 33 34 (see also Figs. 8 and 9) shoved between these parts. The corner-pieces which each consist of two sheet-iron pieces which abut at right angles one against the other are stiffened at their inner sides by angle-iron pieces 35 riveted to them, and grooves 36 are provided at the joint-edges to form guides for the displaceable wedges 31 32 33 34. These wedges are accurately fitted into the grooves, and when assembling the mold-parts and connecting them with each other by means of the tensioning-hooks 37 (Figs. 1, 2, 8, 9), the angle-iron parts in question and the corner-pieces in question are united with each other so as to form a box having completely smooth outer surfaces and taking into the rabbet or groove 37′ (Fig. 2) of the lower casting-frame and being covered at its upper side (forming later on the back of the chest) with a plate 38 having handles 39 and being supported by the structure described. When the wedge-pieces 31 32 33 34 have been disconnected and drawn out of the hardened concrete chest-body, the corner-pieces 27 28 29 30 and the covering-plate 38 are loose and may be easily taken out of the chest-body through the door-opening after the inner casting-core frame has been removed.

The outer falsework is composed of the four corner-pieces 40 41 42 43 (Figs. 1, 2, 5) which, like the inner falsework, consists of sheet-iron pieces which are rounded at their corners and connected with a structure of angle-iron 44 (Figs. 1 2 5 6) to which they are riveted and the object of which is to increase the resistance against the pressure of the concrete. These four corner-pieces are screwed to the outer cast-iron frame by means of nut-bolts 45 and fit accurately into the rabbet there provided for their reception. Connecting the corner pieces with each other is effected at the joints by means of groups of tensioning-clamps 46 comprising each three such ones and being arranged above one another and taking into hooks 47 of the corner sheet-iron pieces whereby a smooth, joint-less closure of the whole outer sheeting is obtained. Upon this outer sheeting rests a cast-iron frame forming an upper closure, as well as a tying-member for the false-work in question. The just-mentioned frame takes with a rabbet accurately into the sheet-iron parts of the corner-pieces 40 41 42 43, and has a rounded groove to form the rounded edges and corners at the back of the chest. This cast-iron frame consists of four parts 48 49 50 51 (Figs. 2 and 5) which may be rigidly connected at their butt-joints by eyes 52 and nut-bolts 53.

The mold for the door is so put up that the outer surface of the door is at the bottom. This mold, as already mentioned in the preamble, consists entirely of grey cast-iron and is composed of the four butt-jointed side-parts 54 55 56 57 which are connected at their joints by set-pins 58 and head-screws 59 (Figs. 3 and 4). The thus obtained closed frame fits accurately into the rabbet of a cast-iron frame 60 which carries the bottom-plate 61 (Fig. 4) and may firmly be connected with the first-mentioned frame by head-screws 62. The outer and the inner frames of flat iron and the join-frames 63 and 64 which are furnished with stone-anchors, as well as the sheet-metal pieces 64', are keyed by tensioning-devices 65 (Fig. 4) to the planed door-mold which corresponds exactly to the door-opening, so that no displacement or other change can take place during filling the concrete into the mold, whereby, after the concrete has hardened and the door has been dismantled, a very exact fitting of the door into the opening provided for it is attained.

To secure the lock-plate, as well as the key-sleeves and the sleeves for the rotary handles in place, guide-bolts 66' are provided which are carried on the one side in the bottom-plate and on the other side in two flat iron bars 68 screwed to eyes 67 of the side-parts 54 and 56 against which they are pressed by an adjusting-screw 69 (Figs. 3 and 4), so that no displacement of said sleeves can occur during applying the concrete and the lock may at once be set in place on further working and finishing the chest.

Having now described my invention, what I desire to secure by a patent of the United States is:

1. A mold for manufacturing concrete money-chests and the like, comprising a rigid machined cast-iron frame forming the lower portion of the mold and constructed to accurately form a door opening in the molded article, bolts for molding the locking-bolt holes in the concrete detachably supported by said frame, and means on said frame for positioning and holding thereon metal fittings for the door opening adapted to be anchored to the concrete during the molding operation, substantially as described.

2. A mold as set forth in claim 1, comprising four corner-pieces and four wedges detachably fitted in between said corner-pieces, substantially as described.

3. A mold for manufacturing concrete money-chests and the like, comprising a rigid machined cast-iron frame forming the lower portion of the mold and constructed to accurately form a door opening in the molded article, bolts for molding the locking-bolt holes in the concrete detachably supported by said frame, and means on said frame for positioning and holding thereon metal fittings for the door opening adapted to be anchored to the concrete during the molding operation, said frame comprising an inner core frame and four outer frame-parts joining the inner core frame and having butt-joints, and screw connections between said frame-parts, said frame-parts having rounded portions adapted to shape the front corners and edges of the molded article.

4. A mold for manufacturing concrete money-chests and the like, comprising a rigid machined cast-iron frame forming the lower portion of the mold and constructed to accurately form a door opening in the molded article, bolts for molding the locking-bolt holes in the concrete detachably supported by said frame, means on said frame for positioning and holding thereon metal fittings for the door opening adapted to be anchored to the concrete during the molding operation, said frame comprising an inner core and an outer frame, each having a groove in its upper edge, and inner and outer sheet-metal frames above said cast-iron frame and having their lower edges received in said grooves, angle-irons forming reinforcing means for said sheet-metal frames and screw connections between said sheet-metal frames and said cast-iron frame.

5. A mold as set forth in claim 4, wherein said inner sheet-metal frame comprises a loosely inserted sheet-metal top plate, four corner-pieces and four wedges inserted between said corner-pieces and tie-hooks connecting said corner-pieces, and wherein said outer sheet-metal frame comprises four corner-pieces and tie-clamps connecting said corner-pieces.

6. A mold for manufacturing concrete doors for money-chests and the like, comprising upper and lower cast-iron frames, screw-connections between said frames, and a bottom plate supported by said lower frame, said lower frame comprising four side members abutting against and connected to each other by screws.

7. A mold for manufacturing concrete doors for money-chests and the like comprising upper and lower cast-iron frames, screw-connections between said frames, a bottom plate supported by said lower frame, said lower frame comprising four side members abutting against and connected to each other by screws, a pair of metal bars supported by the upper frame, and guide-bolts supported by said bottom plate and by said metal bars and adapted to position and support the lock-plate, the key-sleeves and the sleeves for the rotary handles during the molding operation.

Signed at Brussels, Belgium, this ninth day of April A. D. 1921.

WERNER KONRAD THÖRIG.

Witnesses:
F. Y. ZAEREUL,
EMIL VANWAVEELE.